Figure 1:
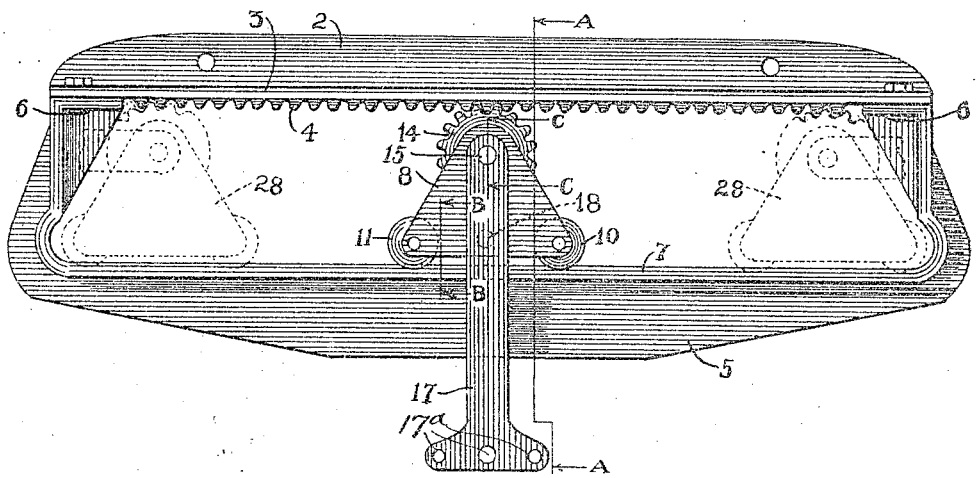

A. C. JOHNSON.
AUTOMATIC ADJUSTABLE DRAW BAR FOR TRACTION ENGINES.
APPLICATION FILED MAR. 4, 1915. RENEWED DEC. 13, 1915.

1,205,351.

Patented Nov. 21, 1916.
2 SHEETS—SHEET 1.

WITNESSES
John A. Naismith
J. B. Cambers

INVENTOR
Alfred C. Johnson
BY P. C. Bates
HIS ATTORNEY

A. C. JOHNSON.
AUTOMATIC ADJUSTABLE DRAW BAR FOR TRACTION ENGINES.
APPLICATION FILED MAR. 4, 1915. RENEWED DEC. 13, 1915.

1,205,351.

Patented Nov. 21, 1916.
2 SHEETS—SHEET 2.

WITNESSES
John A. Naismith
J. B. Cambers

INVENTOR
Alfred C. Johnson
F. C. Bates
BY HIS ATTORNEY

UNITED STATES PATENT OFFICE.

ALFRED C. JOHNSON, OF WINTERS, CALIFORNIA.

AUTOMATIC ADJUSTABLE DRAW-BAR FOR TRACTION-ENGINES.

1,205,351. Specification of Letters Patent. Patented Nov. 21, 1916.

Application filed March 4, 1915, Serial No. 12,140. Renewed December 13, 1915. Serial No. 66,636.

*To all whom it may concern:*

Be it known that I, ALFRED C. JOHNSON, a citizen of the United States, residing at Winters, in the county of Yolo and State of California, have invented a certain new and useful Improvement in Automatic Adjustable Draw-Bars for Traction-Engines, of which the following is a specification.

My invention relates to automatic adjustable draw-bars for traction engines, and the object of my invention is to produce a mechanism by means of which the point of attachment of the load to the engine may be shifted automatically in the direction of the pivotal wheel when said traction engine is turning in either direction. Assuming that a traction engine is pulling a load and is making a turn. If no adjusting device is used the point of attachment of the load to the engine frame remains fixed. The farther this point of attachment is from the pivotal wheel in the direction of the outer wheel the greater the load thrown upon said outer wheel. In my device this point of attachment automatically moves toward the pivotal wheel thus relieving said outer wheel of a portion of its work and throwing the greater portion of the work upon the slower moving pivotal wheel.

A further object of the invention is to produce a simple and inexpensive device of the character mentioned which can be readily and easily attached to a traction engine of any design.

These objects I accomplish by means of such structure and relative arrangement of the parts as will fully appear by a perusal of the following specification and claims.

On the drawings similar reference characters refer to similar parts throughout the several views.

Figure 2:
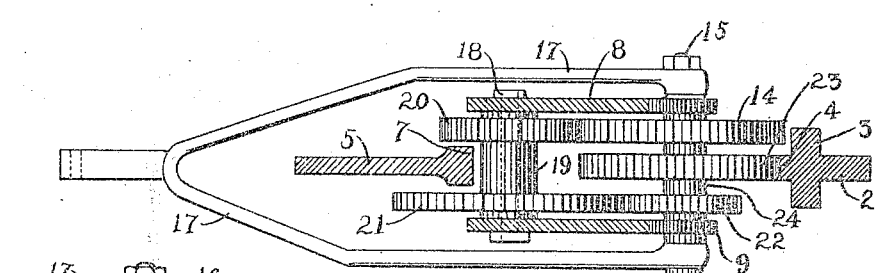
Figure 4:
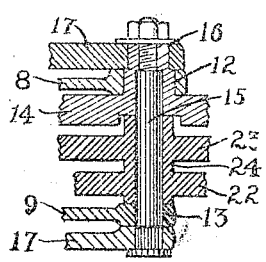
Figure 3:
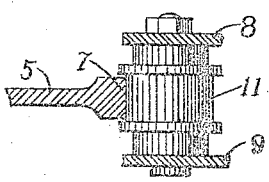
Figure 5:
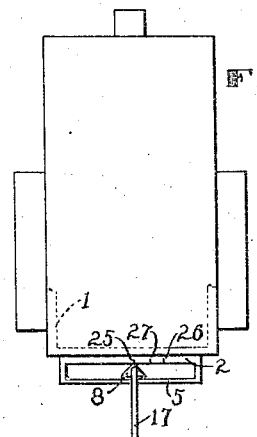

Figure 1 is a plan view of my device. Fig. 2 is an enlarged cross section on line A—A of Fig. 1. Fig. 3 is an enlarged cross section on line B—B of Fig. 1. Fig. 4 is a sectional view on line C—C of Fig. 1, parts being broken away. Figs. 5, 6, 7 and 8 are diagrammatic views illustrating the operation of my device.

Referring now more particularly to the drawings, 1 indicates the frame of the traction engine and 2 the bar of my device which is secured to said frame 1. The outer edge of said bar 2 is provided with a flange 3 and a rack 4 and has a bar 5 bolted thereto by bolts 6 said bar 5 being formed substantially as shown in Fig. 1. A flange is formed on the inner edge of bar 5 as shown at 7. At 8 and 9 are shown the upper and lower plates respectively in which the working parts of my device are journaled, and in which flanged rollers 10 and 11 are journaled. Flanged rollers 10 and 11 are so positioned with relation to plates 8 and 9 as to operate against flange 7 on bar 5 as shown in Fig. 3. Plates 8 and 9 are preferably made triangular in shape with rollers 10 and 11 positioned in two of the angles and bearings 12 and 13 provided in the third angle. At 14 is shown a gear screwed on to shouldered shaft 15 and journaled in bearing 12 and having a square hub at 16 adapted to engage a square hole in one of the arms of draw-bar 17, the other arm of said draw-bar 17 engaging a square shoulder on the opposite end of said shouldered shaft 15. At 18 is indicated a shaft rigidly mounted in plates 8 and 9 respectively. Revolubly mounted on shaft 18 is sleeve 19 carrying gears 20 and 21 respectively in such a manner that gear 20 will engage gear 14 and gear 21 will engage gear 22. Gears 22 and 23 are rigidly mounted on sleeve 24 which revolves freely on shaft 15, gear 23 engaging rack 4.

It may now be seen that with the gears arranged as before described and proportioned approximately as shown in Fig. 2, when gear 14 is turned in one direction by means of draw-bar 17 gears 22 and 23 are turned in the same direction through the medium of gears 20 and 21; and since gear 23 is in engagement with rack 4 the whole movable portion of the device is caused to travel in the direction of movement of said draw-bar a distance depending upon the extent of the movement of said draw-bar and the proportions of the various gears.

Figure 6:
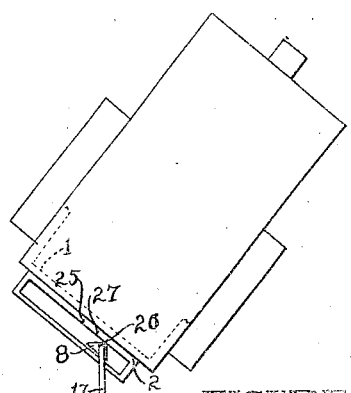
Figure 7:
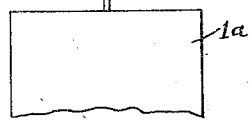
Figure 8:
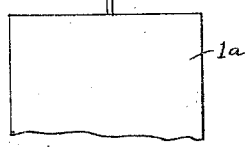

The action of my device is still further illustrated in Figs. 5, 6, 7 and 8 in which a traction engine is shown drawing a load and making a turn. When pulling straight ahead the traction engine and its load, 1ª, are in the relative positions shown in Fig. 5 with the movable portion of my device positioned at the point 25. When the traction engine turns to the right a distance as shown in Fig. 6 the movable portion of my device moves toward the pivotal wheel to a point as 26. As the load 1ᵃ follows the engine which has completed the turn the movable portion of my device moves back toward the point 25, Fig. 7 showing the same at a point 27 on its return movement. In Fig. 8 the load 1ᵃ has also completed the turn and again pulls from point 25. A short turn would cause the movable portion of my device to travel to the extremity of rack 4 as indicated in dotted lines at 28 in Fig. 1, the same traveling to the right or left according to the direction of the turn.

By providing laterally spaced openings 17ᵃ extending to opposite sides of the draft-bar to receive a coupling pin for connecting a drawn vehicle thereto, the said bar may be made to permanently occupy an angular position when one of the off-set openings is in use. Such angular deflection of the draft-bar will cause a shifting of its pivotal point 15 to the side of the tractor frame toward which the bar is swung and thus a side hitch is provided which is useful for many purposes.

Having thus described my invention, what I claim as new and desire to secure by Letters Patent is:—

1. A device of the character described, comprising an oblong frame having a rack formed on the inner edge of one of its long sides, and a laterally movable frame operable by a draw-bar and gear mechanism operatively positioned in said first mentioned frame, said gear mechanism comprising a gear secured to a vertical shaft and journaled in one of the sides of said laterally movable frame and secured to one arm of said draw-bar, said vertical shaft being journaled in the other side of said laterally movable frame and secured to the other arm of said draw-bar, a relatively smaller gear secured to a sleeve revolubly mounted on a vertical shaft secured in said laterally movable frame in such a position that said gear will engage said first mentioned gear, a third and relatively large gear secured to said sleeve, a fourth and relatively small gear secured to a sleeve revolubly mounted on said first mentioned vertical shaft in such a position as to engage said third gear, and a fifth and relatively large gear secured to said last mentioned sleeve and so positioned as to engage in said rack, substantially as shown and described.

2. A device of the character described, comprising an oblong frame having a rack formed on the inner edge of one of its long sides and a track formed on the inner edge of the other long side, and a laterally movable frame operable by a draw-bar and gear mechanism operatively positioned in said first mentioned frame, said gear mechanism comprising a gear secured to a vertical shaft and journaled in one of the sides of said laterally movable frame and secured to one arm of said draw-bar, said vertical shaft being journaled in the other side of said laterally movable frame and secured to the other arm of said draw-bar, a relatively smaller gear secured to a sleeve revolubly mounted on a vertical shaft secured in said laterally movable frame in such a position that said gear will engage said first mentioned gear, a third and relatively large gear secured to said sleeve, a fourth and relatively small gear secured to a sleeve revolubly mounted on said first mentioned vertical shaft in such a position as to engage said third gear, and a fifth and relatively large gear secured to said last mentioned sleeve and so positioned as to engage in said rack, said laterally movable frame having a plurality of rollers mounted therein in such a manner as to engage said track, substantially as shown and described.

3. A draft connection consisting in the combination of a swinging draw-bar and a laterally shiftable fulcrum therefor, a support for the fulcrum, and means operated by the swinging movement of the draft-bar for positively shifting the fulcrum on its support in the direction of the swinging of the draw-bar.

4. A draft connection consisting in the combination of a swinging draw-bar and a laterally shiftable fulcrum therefor, a support for the fulcrum, and means operated by the swinging movement of the draft-bar for positively shifting the fulcrum on its support in the direction of the swinging of the draw-bar, said last named means including speed increasing devices, whereby a slight angular movement of the draw-bar will cause a comparatively great lateral movement of the fulcrum.

5. The combination with a traction engine, of a transversely extending trackway, a rack parallel therewith, a carriage shiftable along said trackway and having gear connections with the rack, a draw-bar fulcrumed on the carriage and operatively connected with the gearing thereon whereby the travel of the carriage on said trackway is controlled through the oscillation of the draw-bar.

6. In combination, draft and drawn vehicles and a swinging draft-bar between the same, a shiftable fulcrum for said bar operable by an angular deflection of the same and adapted to occupy a central point on the draft vehicle when drawn straight, and off-set means on said draft-bar to receive a connection with the drawn vehicle whereby to permit said bar to permanently occupy an angular position to form a side hitch for the drawn vehicle.

7. The combination with a tractor, of a transversely extending trackway, a rack parallel therewith, a carriage shiftable along said trackway, a draft-bar pivoted to said carriage, and speed increasing gearing between the carriage and rack operable by an angular movement of the draw-bar to shift the carriage laterally.

In testimony whereof I have hereunto affixed my signature in presence of two subscribing witnesses.

ALFRED C. JOHNSON.

Witnesses:
 JOHN A. NAISMITH,
 J. B. CAMBERS.